Figure 1:
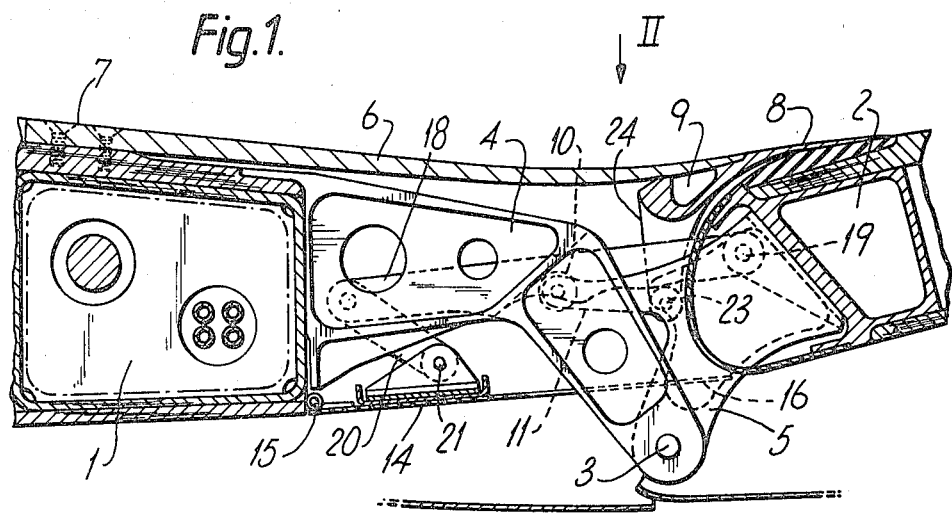

United States Patent [19]

Sharrock et al.

[11] 4,395,008

[45] Jul. 26, 1983

[54] AIRCRAFT WING AND FLAP ARRANGEMENT

[75] Inventors: Barry Sharrock; David P. Halliday, both of Preston, England

[73] Assignee: British Aerospace Public Limited Company, London, England

[21] Appl. No.: 224,959

[22] Filed: Jan. 14, 1981

[30] Foreign Application Priority Data

Jan. 22, 1980 [GB] United Kingdom ................ 8002176

[51] Int. Cl.³ ............................ B64C 3/50; B64C 9/16
[52] U.S. Cl. .................................. 244/215; 244/212; 244/216
[58] Field of Search ..................... 244/90 R, 201, 212, 244/213, 215, 216, 219, 225

[56] References Cited

U.S. PATENT DOCUMENTS

| | | | |
|---|---|---|---|
| 2,836,380 | 5/1958 | Pearson | 244/216 |
| 3,977,630 | 8/1976 | Lewis et al. | 244/216 |
| 4,015,787 | 4/1977 | Maieli et al. | 244/215 |
| 4,120,470 | 10/1978 | Whitener | 244/215 |

FOREIGN PATENT DOCUMENTS

| | | | |
|---|---|---|---|
| 115156 | 10/1945 | Sweden | 244/216 |
| 2003098 | 3/1979 | United Kingdom | 244/215 |
| 2038737 | 7/1980 | United Kingdom . | |

*Primary Examiner*—Charles E. Frankfort
*Attorney, Agent, or Firm*—Cushman, Darby & Cushman

[57] ABSTRACT

An aircraft wing and flap arrangement comprises a fixed wing (1) a flap (2) pivoted at (3) to the fixed wing and a variable camber upper surface member (6) anchored to the fixed wing and resiliently biased toward the flap at all times; a cam track (9) secured to upper surface member (6) and associated cam track engaging member (10) on an arm (11) secured to the flap to control movement of the upper surface member so that on relatively small deflections of the flap (2) the upper surface of the wing is substantially continuous, while on relatively large downward deflections the upper surface is urged, by cam track engaging member (10), away from the flap (2) to open a slot (12); the arrangement may include a lower surface member (14) which is urged towards the upper surface membr (6) on relatively large downward deflections of the flap (2).

8 Claims, 9 Drawing Figures

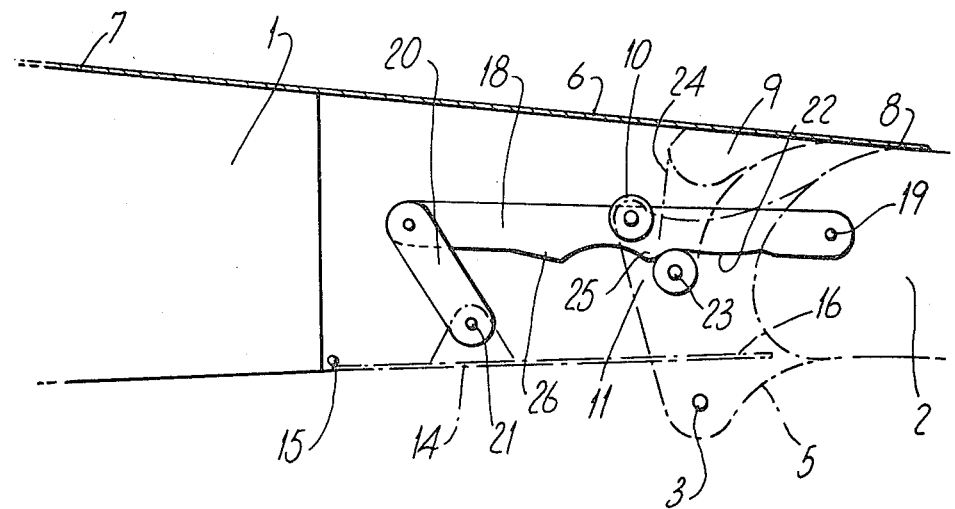
Fig.3.(0°)

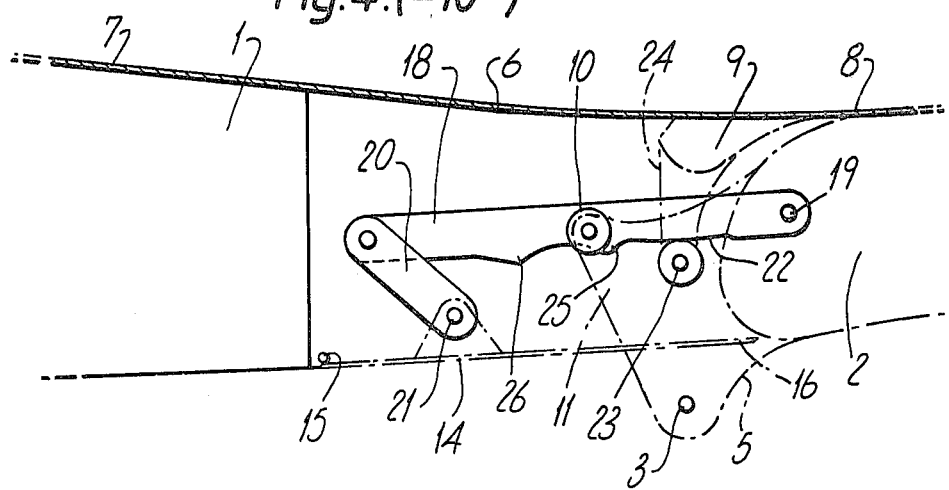
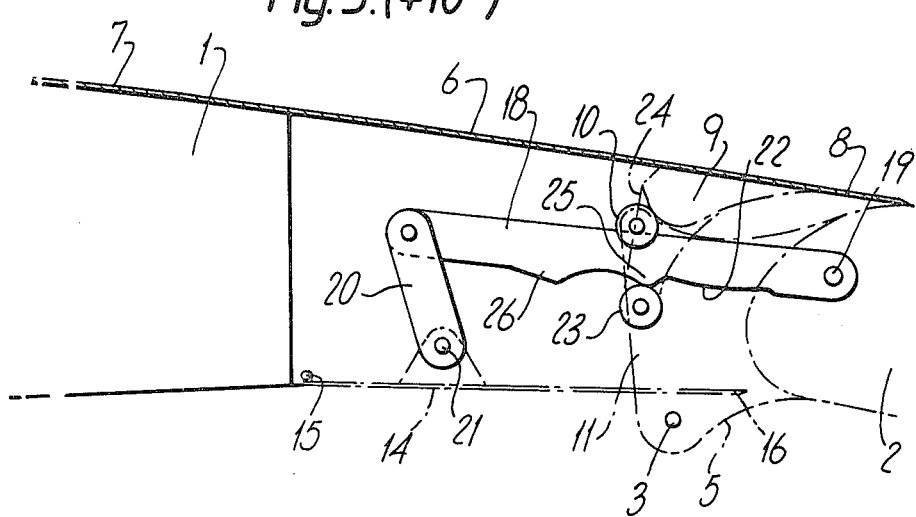

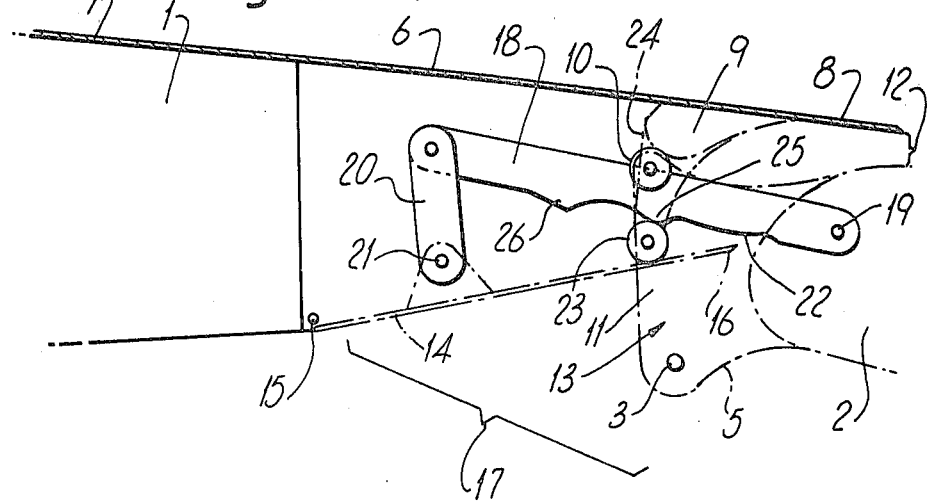
Fig.6.(+13°)
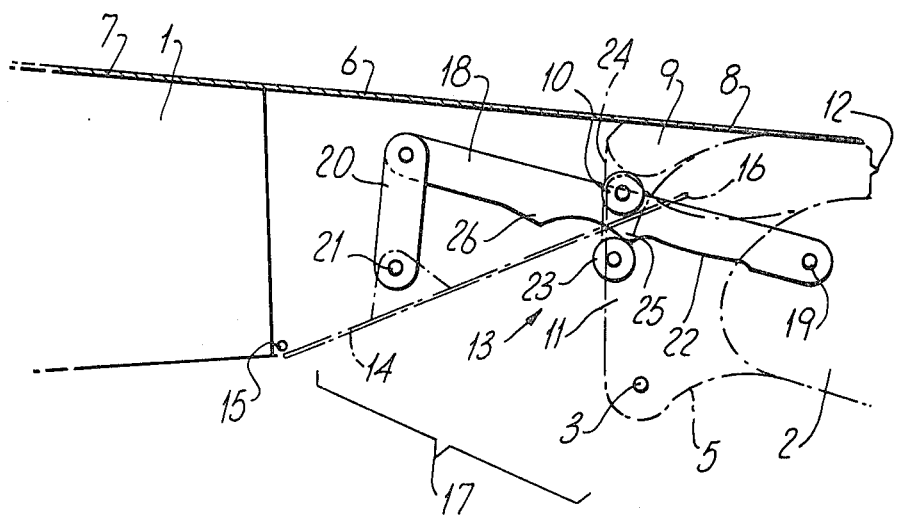
Fig.7.(+17°)

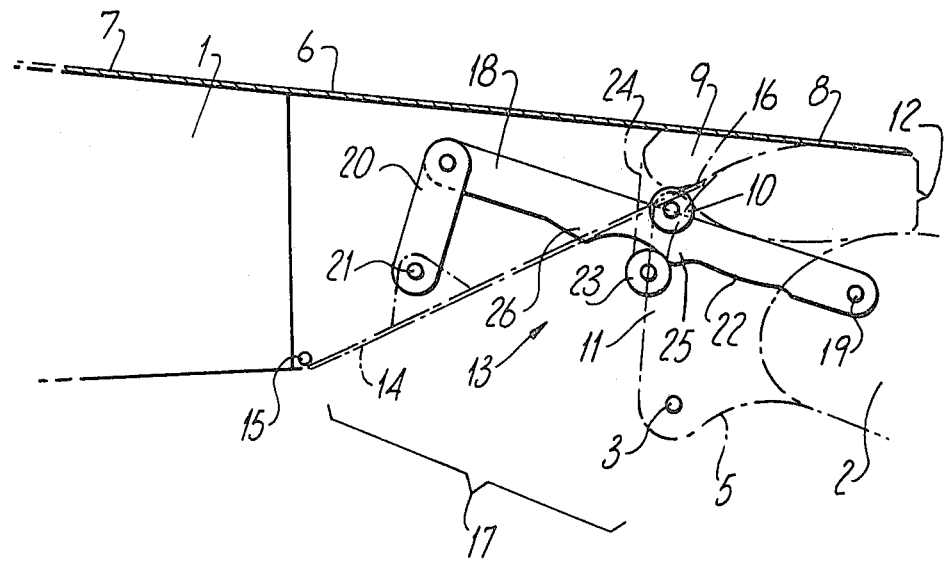
Fig. 8. (+20°)
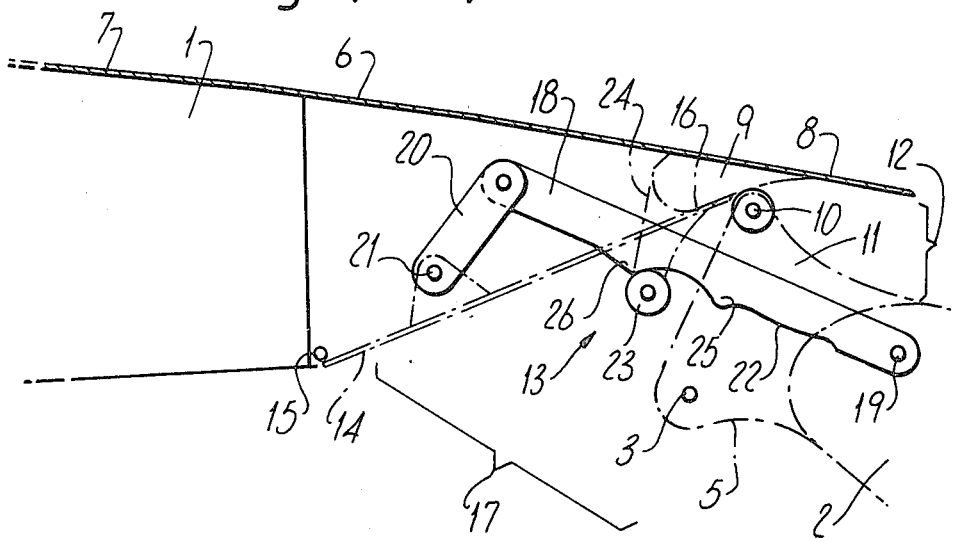
Fig. 9. (+40°)

AIRCRAFT WING AND FLAP ARRANGEMENT

This invention relates to aircraft wing and flap arrangements in which the flap is operable both for control (as an aileron) and for lift increasing purposes (as a high lift device).

The invention has for an objective a wing and flap arrangement which, when the flap is operated solely as an aileron, maintains substantially continuous upper and lower surfaces between the wing and the flap, and, when operated as a high lift device solely or simultaneously as an aileron and as a high lift device, forms a slot between the wing and the flap.

A further objective of the invention is the provision of an upper surface variable camber region on the wing which is arranged to follow the flap movements when the flap is operated as an aileron and also is arranged to provide a slot of desired width and form when the flap is operated as a high lift device.

According to this invention, there is provided a wing and flap arrangement including a fixed wing portion, a flap member extending rearwardly of the fixed wing portion, a variable camber upper surface member in the form of a cantilevered leaf spring, the upper surface member being anchored to the fixed wing portion such that it trails therefrom and is biassed toward the flap member at all times, a pivot pivoting the flap member to the fixed wing portion about a generally spanwise axis, actuation means adapted to effect deflection of the flap member about its pivot, and upper surface urging means for urging the upper surface member from the flap member against the bias of the leaf spring when a slot is required, the upper surface urging means including a cam track and cam track engaging member, one of which is carried by the upper surface member and the other is carried by the flap member and arranged so that on relatively small upward and downward deflection from a neutral position, the upper surface member and the upper surfaces of the fixed wing portion and the flap together define a substantially continuous surface, whilst on relatively large downward deflection from the neutral position the cam track and cam track engagement co-operate to urge the upper surface member from the flap member.

The arrangement preferably further includes a movable lower surface member in the form of a door mounted on the fixed wing portion and trailing therefrom, and lower surface urging means for urging the lower surface member towards the upper surface member when a slot is required, the lower surface urging means including a generally chordwise extending link pivoted to the flap member at one end and, via a further link at the other end, to the lower surface member, a cam track, and a cam track engaging member, one carried by the upper surface member and the other carried by the chordwise link, the shape of the cam track being such that, as relative chordwise movement occurs during small deflections of the flap member from a neutral position, the lower surface member is held trailing towards the flap member, but that during relatively large deflections of the flap member from the neutral position, the lower surface member is urged towards the upper surface member.

Advantageously, the cam track or cam track engaging member of the lower surface urging means carried by the upper surface member is formed as an extension of the cam track or cam track engaging member of the upper surface urging means carried by the upper surface member.

The cam track of the upper surface urging means conveniently is shaped so that the upper surface member is lifted from the flap member when the flap member is deflected downwardly through an angle in excess of approximately 10°.

The cam track of the upper surface urging means is preferably carried by the upper surface member.

The cam track engaging member of the lower surface urging means is preferably carried by the upper surface member. The cam track of the lower surface urging means is advantageously shaped so that during relatively small upward and downward deflections of the flap the lower surface member is urged upwardly and downwardly respectively to define a relatively continuous lower surface for the wing and flap arrangement.

Figure 2:
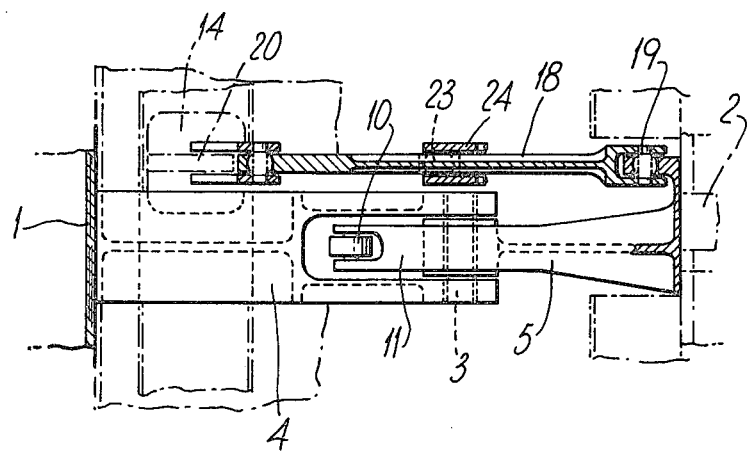

One embodiment of the invention is described by way of example with reference to the accompanying drawings in which:

FIG. 1 is chordwise cross section of a rear portion of an aircraft wing and flap arrangement, FIG. 2 is a plan view of the aircraft wing and flap arrangement, with the components in approximately the position of FIG. 8, and, FIGS. 3 to 9 are similar views to that of FIG. 1 but in outline form for clarity and illustrating the flap member in various position of tilt. These are listed as follows:

FIG. 3: 0°   (that is to say a neutral position)
FIG. 4: −10°  (that is to say upwards)
FIG. 5: +10°  (that is to say downwards)
FIG. 6: +13°
FIG. 7: +17°
FIG. 8: +20°
FIG. 9: +40°

In the Figures an aircraft wing and flap arrangement has a fixed wing portion 1, of which only the rear is shown, and a flap member 2. The latter is pivoted to the fixed wing portion 1 about a spanwise axis by means of a pivot 3 carried on a rearwardly and downwardly extending arm 4 fixedly carried by the fixed wing portion 1. A forwardly and downwardly extending arm 5 connects the flap member 2 with the pivot 3.

As illustrated, the spanwise axis lies below the exterior contour of the wing.

An actuator not shown but preferably in the form of a telescopic jack anchored to an underside of the wing fixed portion 1 and to an underside of the flap member 2 effects tilting of the flap member about its pivot 3.

A variable camber upper surface member 6, in the form of a leaf spring, is rigidly anchored by its forward edge 7 to the fixed wing portion 1. In effect the member 6 is cantilevered to trail aft toward the flap member 2. The trailing edge 8 of the member 6 is biased downwards at all times by its inherent leaf spring effect.

A cam track member 9 is carried by the trailing edge 8 and is positioned with its track facing the interior of the wing for eventual engagement by a cam track engaging member in the form of a roller 10. The roller 10 is mounted upon a forwardly extending arm 11 carried by the pivot arm 5. The items 9 and 10 effectively form an urging means for the upper surface member.

In operation, from the null or neutral position of FIG. 3, the flap member 2 can be tilted up to the −10° position indicated in FIG. 4 and nearly down to the +10° position indicated in FIG. 5 for operation as an aileron without the roller 10 engaging the track of the member 9; accordingly, due to its leaf spring bias, the trailing edge 8 always contacts an upper surface of the flap member and the upper surface member 6 provides a smoothly continuous upper surface between the fixed wing portion 1 and the flap member 2.

As the flap member 2 is further tilted downwards toward the +13° position of FIG. 6 the roller 10 becomes engaged with the track of the member 9 and urges the trailing edge 9 upwards away from the flap member 2 to provide an aperture 12. This aperture 12 forms an exit region of a slot 13 which appears between the fixed wing portion 1 and the flap member 2 when the flap member is operated at relatively high angles of tilt as a high lift device.

The wing and flap arrangement further has a movable lower surface member 14 in the form of a trailing door hinged at a leading edge 15 to the wing fixed member 1 so that its trailing edge 16 can be either aligned with the lower surface of the flap member or directed upwards towards the upper surface member 6 to provide an entrance region 17 and also a leading wall for the slot 13.

An urging means for holding the lower surface member 14 in its extreme positions already described and for causing its movement between the two, includes a chordwise extending arm 18 pivoted at its aft end to the flap member 2 at 19, and pivoted at its forward end, via a further link 20, to the lower surface member 14 at 21. A lower edge 22 of the chordwise arm is formed as a cam track on, and is permanently engaged by, a cam follower in the form of a roller 23. The roller 23 is carried on an arm 24 depending from the cam track member 9 of the upper surface member 6, the arrangement being such that the chordwise arm 18 lies between the roller 23 and the upper surface member 6.

In operation, from the null position of FIG. 3, the flap member 2 can be tilted up to the −10° position indicated in FIG. 4 and down to the +10° position of FIG. 5 for operation as an aileron without causing the entrance to the slot to be revealed by the lower surface member. The lower surface member 14 is maintained in general alignment with the lower surface of the flap member as the flap member is lowered, that is to say the lower surface member is itself lowered about its leading edge, under the action of the roller 23 surmounting a crest region 25 of the cam track 22 as illustrated in FIG. 5.

As the flap member 2 is further tilted downwards towards the +13° position of FIG. 6, and the upper surface member 6 is urged upwards by the collaboration of the roller 10 and the cam track member 9, the roller 23, by virtue of its attachment to the upper surface member 6 and its contact with the cam track 22, tilts the chordwise arm 18 in a clockwise manner about its pivot 19. The lower surface member is thus tilted with its trailing edge 16 upwards to open the slot 13, the inlet aperture to the slot being formed at 17.

Continued downward tilting of the flap member 2 causes the lower surface member to be further upwardly tilted until, in the +20° position of FIG. 8, and thereafter, its trailing edge 16 contacts the cam track member 9 on the upper surface member to form a leading surface of the slot. It is maintained in this position at these relatively high angular settings of the flap member and irrespective of the relative dispositions of the flap member and the trailing edge of the upper surface member, by a further cam crest 26 formed upon the cam track 22.

We claim:

1. A wing and flap arrangement including a fixed wing portion, a flap member extending rearwardly of the fixed wing portion, a variable camber upper surface member in the form of a cantilevered leaf spring, said upper surface member being anchored to said fixed wing portion such that it trails therefrom and is biassed toward said flap member at all times, a pivot pivoting said flap member to said fixed wing portion about a generally spanwise axis, actuation means adapted to effect deflection of said flap member about its pivot, and upper surface urging means for urging said upper surface member from said flap member against the bias of the leaf spring when a slot is required, said upper surface urging means including a cam track and cam track engaging member, one of which is carried by said upper surface member and the other is carried by said flap member and arranged so that on relatively small upward and downward deflection from a neutral position, said upper surface member and the upper surfaces of said fixed wing portion and said flap member together define a substantially continuous surface, whilst on relatively large downward deflection from the neutral position said cam track and cam track engaging member co-operate to urge said upper surface member from said flap member.

2. An arrangement as claimed in claim 1, which further includes a movable lower surface member in the form of a door mounted on the fixed wing portion and trailing therefrom, and lower surface urging means for urging said lower surface member towards the upper surface member when a slot is required, said lower surface urging means including a generally chordwise extending link pivoted to the flap member at one end and, via a further link at the other end, to said lower surface member, a cam track, and a cam track engaging member, one of which is carried by said upper surface member and the other of which is carried by said chordwise link, the shape of said cam track being such that, as relative chordwise movement occurs during small deflections of said flap member from a neutral position, said lower surface member is held trailing towards said flap member, but that during relatively large deflections of said flap member from the neutral position, said lower surface member is urged towards said upper surface member.

3. An arrangement as claimed in claims 1 or 2 wherein the cam track of the upper surface urging means is shaped so that the upper surface member is lifted from the flap member when said flap member is deflected downwardly through an angle in excess of approximately 10°.

4. An arrangement as claimed in claim 1 wherein the cam track of the upper surface urging means is carried by the upper surface member.

5. An arrangement as claimed in claim 2 wherein the cam track engaging member of the lower surface urging means is carried by the upper surface member.

6. An arrangement as claimed in claim 2 wherein the lower surface member is hingedly mounted on the fixed wing portion.

7. An arrangement as claimed in claim 2, wherein the cam track of the lower surface urging means is shaped so that during relatively small upward and downward deflections of the flap, from a neutral position, the lower surface member is urged upwardly and downwardly respectively to define a relatively continuous lower surface for the wing and flap arrangement.

8. An arrangement as claimed in claim 2 wherein the portion of the lower surface urging means carried by the upper surface member is formed as an extension of that portion of the upper surface urging means carried by said upper surface member.

* * * * *